United States Patent Office 3,007,771
Patented Nov. 7, 1961

3,007,771
MANUFACTURE OF LITHIUM CARBONATE
Harold Mazza, Whittier, Calif., Robert L. Craig, San Antonio, Tex., and Herbert R. Foster, Jr., Trona, Calif., assignors to American Potash & Chemical Corporation, a corporation of Delaware
No Drawing. Filed Nov. 30, 1956, Ser. No. 625,253
1 Claim. (Cl. 23—63)

This invention relates to the manufacture of lithium carbonate.

Lithium carbonate has various industrial uses. It has been the practice heretofore to manufacture lithium carbonate from a lithium sulfate solution, the product having an acceptable granular size.

During recent years there has been a significant expansion of the lithium industry with lithium hydroxide monohydrate becoming the cheapest and most abundant lithium containing compound of commerce. It is probable that the future large scale production of lithium carbonate will more and more rely upon the use of the hydroxide as the basic starting material. However, when one attempts to reproduce the acceptable granular size of the lithium carbonate obtained from a lithium sulfate solution in a lithium carbonate obtained by carbonation of a lithium hydroxide solution, numerous difficulties are encountered in that the product lacks the requisite physical properties and, further, the product can be dewatered only with difficulty. Typical comparative finenesses are shown in the following table:

*Table I*

| Sample | U.S. Screen Nos. (Cumulative Percent) | | |
|---|---|---|---|
| | +100 | +200 | +325 |
| Direct carbonation of LiOH solution, using a gas containing 11% $CO_2$ | 2.6 | 13.4 | 43.4 |
| Direct carbonation of LiOH solution, using 100% $CO_2$ gas | 4.1 | 24.1 | 45.9 |
| Product from $Li_2SO_4$ | 13.4 | 58.1 | 78.8 |

We have discovered a process by which a granular lithium carbonate product can be produced directly from lithium hydroxide monohydrate. The process includes the carbonation of a lithium hydroxide solution using an alkali metal carbonate such as sodium or potassium as the $CO_2$ carrier. In practice, a lithium hydroxide solution is mixed with one containing an alkali metal carbonate in accordance with the reaction in the case of sodium carbonate:

$$Na_2CO_3 + 2LiOH \rightarrow Li_2CO_2 + 2NaOH$$

The precipitated lithium carbonate can be readily separated at this point in the process. The caustic bearing liquor may subsequently be carbonated with flue gas and concentrated to produce a sodium carbonate solution suitable for re-use. However, the preferred procedure is to conduct the gaseous carbonation and the concentration step prior to separating the solids. A larger crop may be obtained per cycle in this fashion and the hazards involved in handling caustic solutions are avoided. The additional $Li_2CO_3$ is obtained by virtue of the water removal and also because $Li_2CO_3$ is less soluble in a carbonate solution than it is in the comparable alkali metal hydroxide solution. The purity of commercial grades of the raw material, lithium hydroxide monohydrate, is such that a process bleed stream is not necessary. Impurities are carried off in the product with no significant contamination effects. The product usually contains less than 0.05% $Na_2O$, which is usually an acceptable upper limit. Sodium carbonate is preferred but any other of the alkali metal carbonates can be employed.

The granular nature of these different products is shown in the following Table II; the first product was obtained by adding a sodium carbonate solution to a lithium hydroxide solution while the second was obtained by the reverse procedure, that is, the lithium hydroxide solution was added to the sodium carbonate solution. The former method is preferred since a greater quantity of material is retained on a 200 mesh screen and, accordingly, has less tendency to dust when handled. In addition, microscopic examinations have shown that when a sodium carbonate solution is added to the hydroxide solution, a dense, blocky crystal is produced while when the reverse method of addition is practiced, the crystals formed are more or less fluffy and weak.

*Table II*

| Product | U.S. Screen Nos. (Cumulative Percent) | | |
|---|---|---|---|
| | +100 | +200 | +325 |
| 1 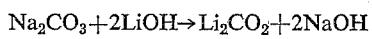 | 29.5 | 92.1 | |
| 2 | 51.6 | 80.0 | |

The following is an example of the batch-wise production of 335 pounds of lithium carbonate by the presently preferred process:

In a reactor, 390 pounds of lithium hydroxide monohydrate (97% assay) were dissolved in 150 gallons of water. The solution was heated to 100° C. and when all the lithium hydroxide had dissolved, 256 gallons of 22.5% sodium carbonate solution from a previous batch were added; about one hour was required for this addition. After addition of the sodium carbonate solution, 181 gallons of water were evaporated by means of submerged combustion; evaporation by such means is well-known and need not be further described. Simultaneously, the sodium hydroxide formed during the reaction was carbonated by the carbon dioxide in the burner exhaust gases; the preceding operation took three hours.

Since the submerged combustion burner did not supply sufficient carbon dioxide to complete the carbonation, supplemental flue gas was used to make up the difference. When the carbonation and evaporation operation was complete, the slurry was allowed to settle and 79 gallons of clear liquor decanted to adjust the slurry density to the desired 20 weight percent. The lithium carbonate (351 pounds of wet solids) was then separated from the remaining liquor by centrifuging. This operation was performed at about 80° to 90° C. The solids were washed with 13 gallons of water and the wash water combined with the filtrate. The diluted filtrate (177 gallons) together with the 79 gallons of decant was used to carbonate the next batch.

The washed solids were dried at from 50° C. to 600° C. (120° C. is preferred). The product had approximately the following composition:

| | Percent |
|---|---|
| $Li_2CO_3$ | 99.41 |
| $Na_2CO_3$ | 0.09 |
| $H_2O$ | 0.50 |

The cumulative screen analysis of the material produced in this fashion is shown in Table II as product 1.

A modification of the foregoing process results in a reduction of the amount of water which must be evaporated in the processing steps. In the preferred process, the solid lithium hydroxide is first dissolved in water followed by addition of the sodium carbonate solution. The reaction products are a lithium carbonate crystal and a sodium hydroxide solution. It is possible and sometimes advantageous to decant from the reaction products a portion of clear sodium hydroxide solution containing also a minor amount of dissolved lithium carbonate, the remaining slurry of lithium carbonate in sodium hydroxide solution being sent to the carbonating and evaporating steps of the process. The decant portion is employed instead of water to dissolve the solid lithium hydroxide entering the process. A small amount of lithium carbonate precipitates as the lithium hydroxide is dissolved; this is removed by filtration and sent to the carbonating and evaporating vessel. To the clear filtrate, the solution of lithium hydroxide and sodium hydroxide, further quantities of sodium carbonate solution are added to precipitate granular lithium carbonate.

We claim:

A process for producing lithium carbonate comprising: adding an aqueous sodium carbonate solution to a body of an aqueous lithium hydroxide solution to form solid lithium carbonate as a precipitate and an aqueous solution of lithium carbonate and lithium hydroxide; passing carbon dioxide into said solution to convert the sodium hydroxide so formed to sodium carbonate and evaporating water from said solution to precipitate additional solid lithium carbonate and thereafter at one time separating the lithium carbonate precipitate initially formed and the additional solid lithium carbonate formed when said carbon dioxide is passed into said solution and water is evaporated from said solution.

References Cited in the file of this patent

UNITED STATES PATENTS

| | | |
|---|---|---|
| 2,021,987 | Colton | Nov. 26, 1935 |
| 2,413,644 | Nicholson | Dec. 31, 1946 |
| 2,793,934 | Cunningham | May 28, 1957 |